United States Patent [19]

Ueda et al.

[11] Patent Number: 5,092,160

[45] Date of Patent: Mar. 3, 1992

[54] SYSTEM AND METHOD FOR DETECTING ENGINE KNOCK IN INTERNAL COMBUSTION ENGINES

[75] Inventors: Hiroyuki Ueda; Nobutaka Takahashi, both of Kanagawa, Japan

[73] Assignee: Nissan Motor Company, Limited, Japan

[21] Appl. No.: 454,540

[22] Filed: Dec. 21, 1989

[30] Foreign Application Priority Data

Dec. 22, 1988 [JP] Japan ................................ 63-325101

[51] Int. Cl.⁵ ............................................ G01L 23/22
[52] U.S. Cl. ................................................ 75/35
[58] Field of Search ............................................ 73/35

[56] References Cited

U.S. PATENT DOCUMENTS 4,478,068 10/1984 Bonitz et al. ............................. 73/35
4,640,249 2/1987 Kawamura et al. ................ 123/425

FOREIGN PATENT DOCUMENTS 52-87537 7/1977 Japan .

Primary Examiner—John E. Chapman
Attorney, Agent, or Firm—Lowe, Price, LeBlanc & Becker

[57] ABSTRACT

A system and method for detecting occurrence of engine knock in internal combustion engines are disclosed which include: at least one engine knock sensor installed in an appropriate position at each engine cylinder, a band pass filter for passing a particular component of an output signal from an engine knock sensor, a rectifier for rectifying the particular component of the output signal passed through the band pass filter and an integrator for integrating the rectified signal with a variable interval. A device is also provided whereby engine driving conditions are detected, the integration interval being varied according to engine driving conditions so that no overlap of the integration interval of one cylinder with the ignition timing of another occurs. The integrated value derived by the integrator is corrected according to the variable interval, and the occurrence of knock in synchronization with the corrected integrated value is verified.

12 Claims, 3 Drawing Sheets

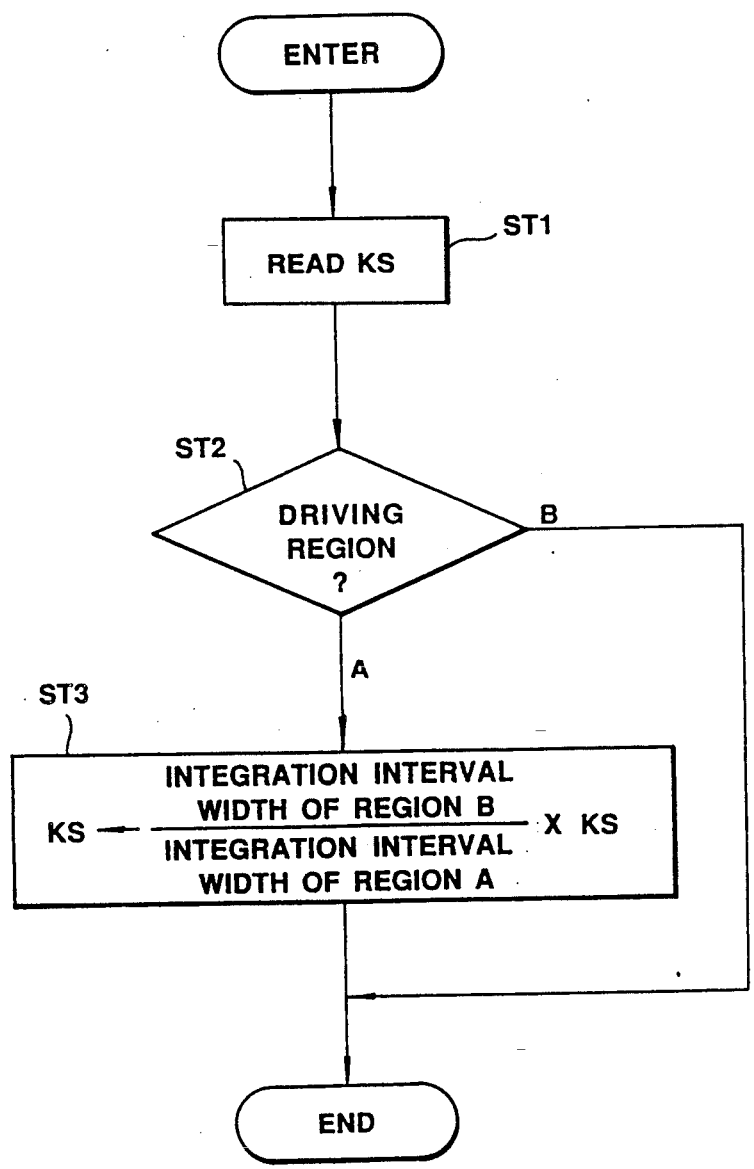

SYSTEM AND METHOD FOR DETECTING ENGINE KNOCK IN INTERNAL COMBUSTION ENGINES

BACKGROUND OF THE INVENTION (1) Field of the invention

The present invention relates to a system and method for detecting engine knock in an internal combustion engine and particularly to a system and method for detecting engine knock on the basis of an integrated value of a knock signal derived from a knock sensor.

(2) Background of the art

Various types of ignition timing control systems have been proposed in which knock sensor(s) are installed on the engine to detect and inform of the occurrence of engine knock vibrations, the ignition timing is fed back to the limit of the knock frequency on the basis of the signal from the knock sensor(s).

A Japanese Patent Application First publication No. Showa 52-87537 published on July 21, 1977 exemplifies one of the previously proposed ignition timing systems in which during a constant interval after ignition of any engine cylinder is carried out, the knock signal is integrated and a control unit determines occurrence of knock when the integrated value of the signal thereof exceeds a reference value. A method of determining knock occurence is also exemplified by U.S. Pat. No. 4,640,249 issued on Feb. 2, 1987.

Specifically, after the output signal of the knock sensor is supplied to a band pass filter to pass the knock frequency component therethrough, the knocking frequency is rectified and integrated during a constant crank interval, e.g., ATDC (After Top Dead Center) 10° through ATDC 60°. The derived integrated value indicates the knock energy for each ignition.

Therefore, more accurate knock determination can be carried out as compared with determining knock from a peak value of the output signal from a knock sensor as in previous methods of knock detection known in the art.

Since engine knock is often generated at slightly different timings due to uncertain factors such as fuel use characteristics, it is desirable to provide a relatively long period for the integration interval in order to make an accurate determination of engine knock.

However, in multi-cylinder engines such as an eight-cylinder or twelve-cylinder engine, the interval between ignition of each engine cylinder becomes short. Therefore, if the integration interval is provided as, for example, ATDC 10° through ATDC 60°, there is a possiblity that ignition of the subsequent cylinder will be executed within the integration interval provided for the previous cylinder when the ignition timing is advanced in a high-speed, low-load running state of the engine. Consequently, erroneous detection of knock due to ignition noise may result.

SUMMARY OF THE INVENTION

It is, therefore, an object of the present invention to provide an improved system and method for detecting engine knock for internal combustion engines in which the integration interval is varied with the ignition advance angle of the engine taken into consideration to prevent erroneous detection of engine knock due to ignition noise.

The above-described object can be achieved by providing a system for detecting occurrence of engine knock in an internal combustion engine, comprising: a) engine driving condition detection means for detecting an engine driving condition; b) vibration detecting means for detecting mechanical vibrations of at least one cylinder in the engine and for generating a vibration signal according to the detected vibrations; c) filtering means for passing a particular frequency component of the vibration signal from the vibration detecting means; d) rectifying means for rectifying the particular component of the vibration signal passed through the filtering means and outputting a rectified signal; e) integrating means for integrating the rectified signal from the rectifying means during an interval of integration; f) setting means for variably setting a crank angle range for which the integrating means integrates the rectified signal according to the detected engine driving condition so that the integration interval for one cylinder does not overlap an ignition timing of another engine cylinder; g) correcting means for correcting an integration value derived by the integrating means according to the crank angle range; and h) determining means for determining whether an engine knock occurs based on the corrected integration value derived by the correcting means.

The above-described object can also be provided by a system for detecting occurrence of engine knock in multi-cylinder internal combustion engines, comprising a) at least one engine knock sensor installed in an appropriate position at each engine cylinder; b) a band pass filter for passing a particular component of an output signal from an engine knock sensor; c) a rectifier for rectifying the particular component of the output signal passed through the band pass filter; d) an integrator for integrating the rectified signal during an integration interval in a variable crank angle range; e) first means for detecting an engine driving condition; f) second means for varying the crank angle range according to the engine driving condition to avoid overlap between the integration interval for one cylinder and an ignition timing of another cylinder; g) third means for correcting the integrated value derived by the integrator according to said variable crank angle range; and h) fourth means for determining whether engine knock occurs based on the corrected integrated value.

The above-described object can also be achieved by providing a method for detecting engine knock in internal combustion engines, comprising the steps of: a) providing an engine knock sensor installed in an appropriate position at each engine cylinder; b) providing a band pass filter for passing a particular component of at least one output signal from an engine knock sensor; c) providing a rectifier for rectifying the particular component of the output signal passed through the band pass filter; d) providing an integrator for integrating the rectified signal during an integration interval in a variable crank angle range; e) detecting an engine driving condition; f) varying the a length of the crank angle range according to the detected engine driving conditions to avoid overlap between an integration interval of one cylinder and ignition timing of another, thereby avoiding erroneous detection of engine knock based on ignition noise; g) correcting the integrated value derived by the integrator according to the length of the variable crank angle range; and h) determining whether an engine knock occurs on the basis of the corrected integrated value.

BRIEF DESCRIPTION OF THE DRAWINGS

FIG. 5 is an operational flowchart representing a correction program for the integrated value.

DETAILED DESCRIPTION OF THE PREFERRED EMBODIMENT

Reference will hereinafter be made to the drawings in order to facilitate a better understanding of the present invention.

Figure 1:
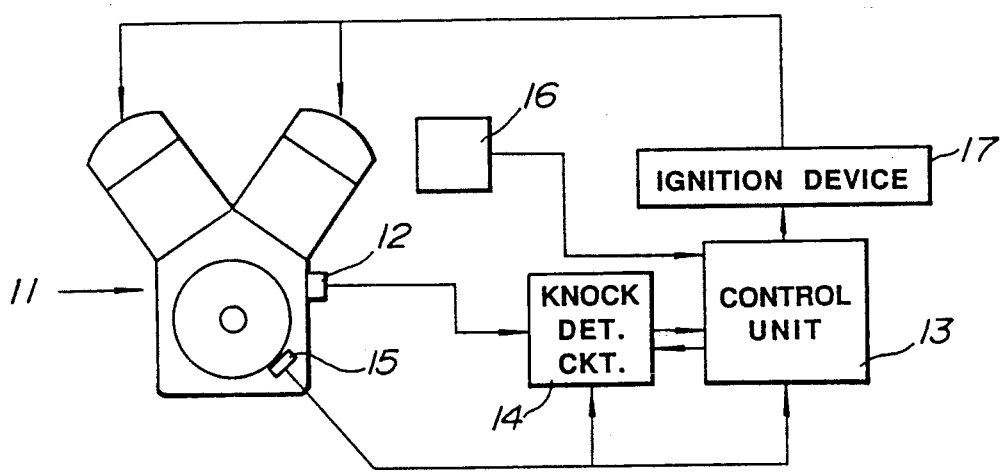
FIG. 1 is a schematic drawing of the engine knock detecting system of a preferred embodiment according to the present invention.

FIG. 1 shows a schematic drawing of a preferred embodiment of an engine knock detection system.

A knock sensor 12 is installed in an appropriate position on an engine, e.g., on a side surface of a cylinder block, the engine 11 being constituted by a V-type eight-cylinder engine.

The knock sensor 12 utilizes, e.g., a piezoelectric element and detects mechanical vibration of the cylinder block caused by engine knock. The knock sensor is exemplified by U.S. Pat. No. 4,640,249 issued on Feb. 2, 1987, the disclosure of which is hereby incorporated by reference.

An output signal of the knock sensor 12 is supplied to a knock detection circuit 14 in which the output signal is processed into an integration value indicating a magnitude of engine knock energy. Thereafter, the integrated value is input into a control unit 13 which includes a microcomputer.

A crank angle sensor 15 detects the revolution of the engine crankshaft. The crank angle sensor 15 outputs a POS indication via a pulse signal indicating a unit (n°) angle of crankshaft revolution and a REF signal indicating top dead center (TDC) for each cylinder. In addition, an airflow meter 16 detects an intake air quantity of the engine 11.

The control unit 13 determines occurence of engine knock in accordance with a predetermined program (as will be described later) and controls ignition timing.

A basic ignition timing is determined on the basis of detection signals derived from the crank angle sensor 15, airflow meter 16, and so on, and the basic ignition timing is corrected on the basis of determination of the occurence of engine knock.

An ignition device 17 includes an ignition coil and power transistor. The ignition device 17 operates in accordance with the ignition timing determined by the control unit 13, sequentially carrying out ignition of each cylinder.

Figure 3:
FIGS. 3(a) through 3(e) are waveform charts for the knock detection circuit shown in FIG. 2.
Figure 3:
Figure 3:
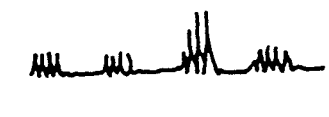
Figure 3:
Figure 3:

The knock detection circuit 14 includes: a band pass filter 21 which separates and passes only a particular component particular to the knock from an output signal (FIG. 3 (a)) from the knock sensor 12; a rectifying circuit 22 which rectifies the output signal (FIG. 3 (b)) of the band pass filter (BPF) 21; an integration circuit 23 which integrates the rectified signal (FIG. 3 (c)) for each ignition; and an A/D converter 24 which converts the output signal (FIG. 3 (e)) of the integration circuit 23 into a digital signal.

It is noted that an integration interval signal (FIG. 3 (d)) output from an integration interval signal generator 25 limits the integration interval of the integration circuit 23.

The integration interval is set with the engine crank angle as a unit. The integration interval signal (FIG. 3 (d)) is output on the basis of the POS signal and REF signal derived from the crank angle sensor 15.

In the preferred embodiment, two integration intervals are provided; ATDC10° through ATDC60°, and ATDC 10° through ATDC 40°.

In addition, an interval switching signal (f) is output from the control unit 13 to selectively output either of two integration interval signals (FIG. 3 (d)) from the integration interval signal generator 25 to the integration circuit 23.

Figure 2:
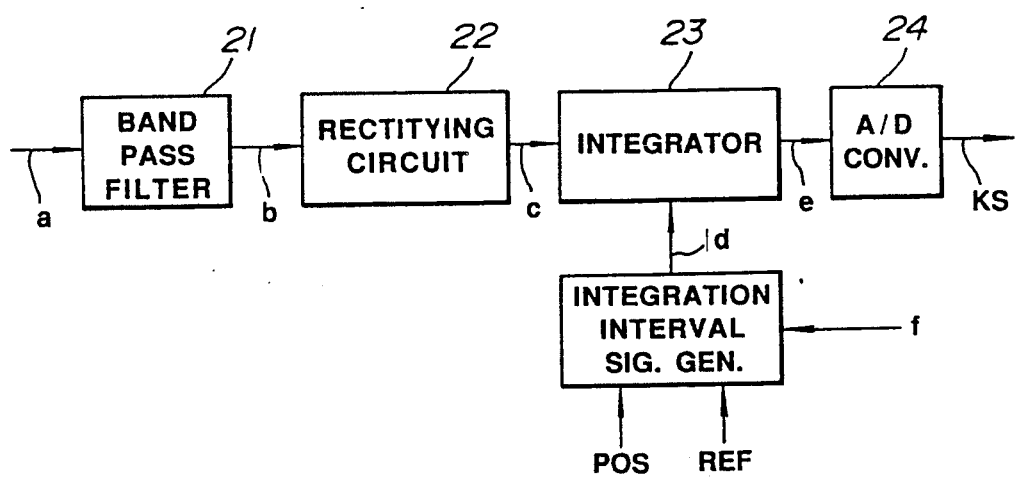
FIG. 2 is a circuit block diagram of the knock detection circuit shown in FIG. 1.

It is noted that the alphabetic symbols in FIG. 3 corresponds to those shown in FIG. 2.

Figure 4:
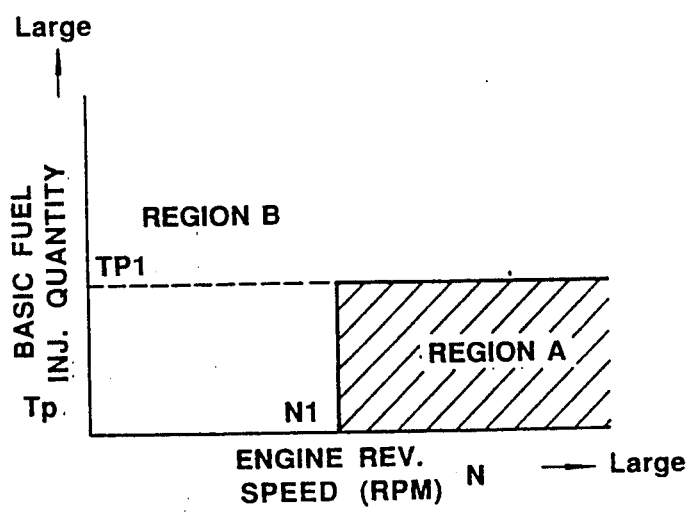
FIG. 4 is a characteristic graph representing the relationship between switching of the integration interval and engine driving conditions.

The switching of the integration intervals are determined on the basis of engine driving conditions by the control unit 13. Specifically, as appreciated from FIG. 4, in a region where the engine revolution speed is above a predetermined value N1 and an engine load is below a predetermined value TP1, with the engine revolution speed N and load set as parameters, (the load being, for example, the basic fuel injection quantity $T_p$), the integration interval of ATDC 10° through ATDC 40° is selected as the integration interval. In a running condition other than the above, the integration interval of ATDC 10° through ATDC 60° is selected.

That is to say, a more advanced angle of basic ignition timing is provided as the engine revolution speed is increased. However, as described above, in the region A in which the engine revolution speed is high and the load is low, the integration interval is set shorter so that an overlap between the integration interval for any one of the cylinders and that for subsequent cylinders can be avoided.

It is noted that it is possible to determine the integration interval from the ignition timing advance quantity itself in place of determination of the integration interval from load and engine revolution speed as described above.

On the other hand, if the integration interval is varied, the derived integration value becomes different even though knock energy having the same level is provided.

The control unit 13, then, corrects the integration value according to the length of the integration interval.

FIG. 5 shows a flowchart of the correction program for the integration value.

In a step ST1, the control unit 13 reads the integrated value KS of the integrator 23 via the A/D converter 24.

In a step ST2, the control unit 13 determines whether the engine driving condition falls in the above described A or B region.

If the region is B, the control unit 13 does not carry out correction of the integrated value. The integrated value KS is directly used for determination of engine knock.

On the other hand, if the region is A, the routine goes to a step ST3 in which the integrated value is corrected according to the integration interval.

For example, correction of the integrated value is carried out in proportion to the integration interval. Correction to a degree proportional to the integration interval is carried out and the integrated value KS after correction is used to determine occurrence of knock.

A program for determining the occurrence of knock is not shown.

However, the above-described integrated value KS is compared with the sum of, e.g., background noise BGL and threshold level SL (BGL+SL). If the integrated value KS is larger than the combination of the BGL and the threshold level, the control unit 13 determines the occurrence of engine knock.

The background level BGL is, e.g., derived as a moving average of the instantaneous integrated values and, the slice level SL is determined from a data table corresponding to engine revolution speed.

Although in the preferred embodiment the integration interval is switched in two stages, the integration interval may be switched in a plurality of stages (more than two) or switched continuously.

As described hereinabove, since, in the engine knock detecting system and method according to the present invention, the integration interval is set shorter in engine driving conditions in which the ignition timing is advanced, no overlap between the integration interval of one cylinder and the ignition timing of a subsequent cylinder occurs. Therefore, erroneous detection of knock due to ignition noise can be prevented. On the other hand, in driving conditions in which the ignition timing is retarded, the integration interval can be set adequately. Therefore, the accuracy of engine knock detection becomes high.

Particularly, knock problems occur under low-speed, high-load driving conditions, i.e., during acceleration in a driving region in which the basic ignition timing is small. Engine knocking rarely occurs in a high-speed, low-load region in which the basic ignition timing is large.

Consequently, the integration interval is varied in order to prevent erroneous detection of knock without loss of the accuracy of knock control and with sufficient accuracy of knock detection being maintained It will fully be appreciated by those skilled in the art that the forgoing description is made in terms of the preferred embodiment and various changes and modifications may be made without departing from the scope of the present invention which is to be defined by the appended claims.

What is claimed is:

1. A system for detecting occurrence of engine knock for an internal combustion engine, comprising:
   a) engine driving condition detecting means for detecting an engine driving condition;
   b) vibration detecting means for detecting mechanical vibrations of at least one cylinder in the engine and for generating a vibration signal according to the detected vibrations;
   c) filtering means for passing a particular frequency component of the vibration signal from the vibration detecting means;
   d) rectifying means for rectifying the particular component of the vibration signal passed through the filtering means and outputting a rectified signal;
   e) integrating means for integrating the rectified signal from the rectifying means during an interval of integration;
   f) setting means for variably setting a crank angle range for which the integrating means integrates the rectified signal according to the detected engine driving condition so that the integration interval for one cylinder does not overlap an ignition timing of another engine cylinder;
   g) correcting means for correcting an integration value derived by the integrating means according to the crank angle range; and
   h) determining means for determining whether an engine knock occurs based on the corrected integration value derived by the correcting means.

2. A system as set forth in claim 1, wherein the vibration detecting means includes at least one knock sensor of a piezoelectric type installed on the engine for detecting mechanical vibrations in the engine.

3. A system as set forth in claim 2, wherein the filtering means includes a band pass filter for passing a frequency component particular to an engine knock frequency.

4. A system as set forth in claim 1, wherein the setting means sets the crank angle range in two stages; ATDC (After Top Dead Center in a compression stroke) 10° through ATDC 40° which is set when the engine driving condition falls in an A region in which engine revolution speed exceeds a first predetermined value and engine load is below a second predetermined value and ATDC 10° through ATDC 60° which is set when the engine driving condition falls in a B region in which engine revolution speed is below said first predetermined value or engine load is above said second predetermined value.

5. A system as set forth in claim 4, wherein the correcting means corrects the integrated value in proportion to an interval when the engine driving condition falls in the A region.

6. A system as set forth in claim 5, wherein the correcting means does not correct the integrated value when the engine driving condition falls in the B region.

7. A system as set forth in claim 6, wherein the determining means determines whether the integrated value derived by the correcting means exceeds a sum of, a background level BGL and a threshold level SL, the background level being a moving average of the instantaneous integrated values and the threshold level being derived from a table corresponding to the engine revolution speed.

8. A system as set forth in claim 1, wherein the crank angle range is set continuously according to the engine driving condition.

9. A system as set forth in claim 4, wherein the engine load is indicated by a basic fuel injection quantity to be supplied to the engine.

10. A system as set forth in claim 1, wherein the vibration detecting means comprises a plurality of knock sensors installed in appropriate positions at the respective engine cylinders.

11. A system for detecting occurrence of engine knock in multi-cylinder internal combustion engines, comprising:
   a) at least one engine knock sensor installed in an appropriate position at each engine cylinder;
   b) a band pass filter for passing a particular component of an output signal from an engine knock sensor;
   c) a rectifier for rectifying the particular component of the output signal passed through the band pass filter;
   d) an integrator for integrating the rectified signal during an integration interval in a variable crank angle range;
   e) first means for detecting an engine driving condition;

f) second means for varying the crank angle range according to the engine driving condition to avoid overlap between the integration interval for one cylinder and an ignition timing of another cylinder;
g) third means for correcting an integrated value derived by the integrator according to said variable crank angle range; and
h) fourth means for determining whether an engine knock occurs based on the corrected integrated value.

12. A method for detecting engine knock in internal combustion engines, comprising the steps of:
a) providing an engine knock sensor installed in an appropriate position at each engine cylinder;
b) providing a band pass filter for passing a particular component of an output signal from at least one engine knock sensor;
c) providing a rectifier for rectifying the particular component of the output signal passed through the band pass filter;
d) providing an integrator for integrating the rectified signal during an integration interval in a variable crank angle range;
e) detecting an engine driving condition;
f) varying a length of the crank angle range according to the detected engine driving conditions to avoid overlap between an integration interval of one cylinder and ignition timing of another, thereby avoiding erroneous detection on engine knock based on ignition noise;
g) correcting an integrated value derived by the integrator according to the length of the variable crank angle range; and
h) determining whether an engine knock occurs on the basis of the corrected integrated value.

* * * * *